INVENTOR
Pierre Berger

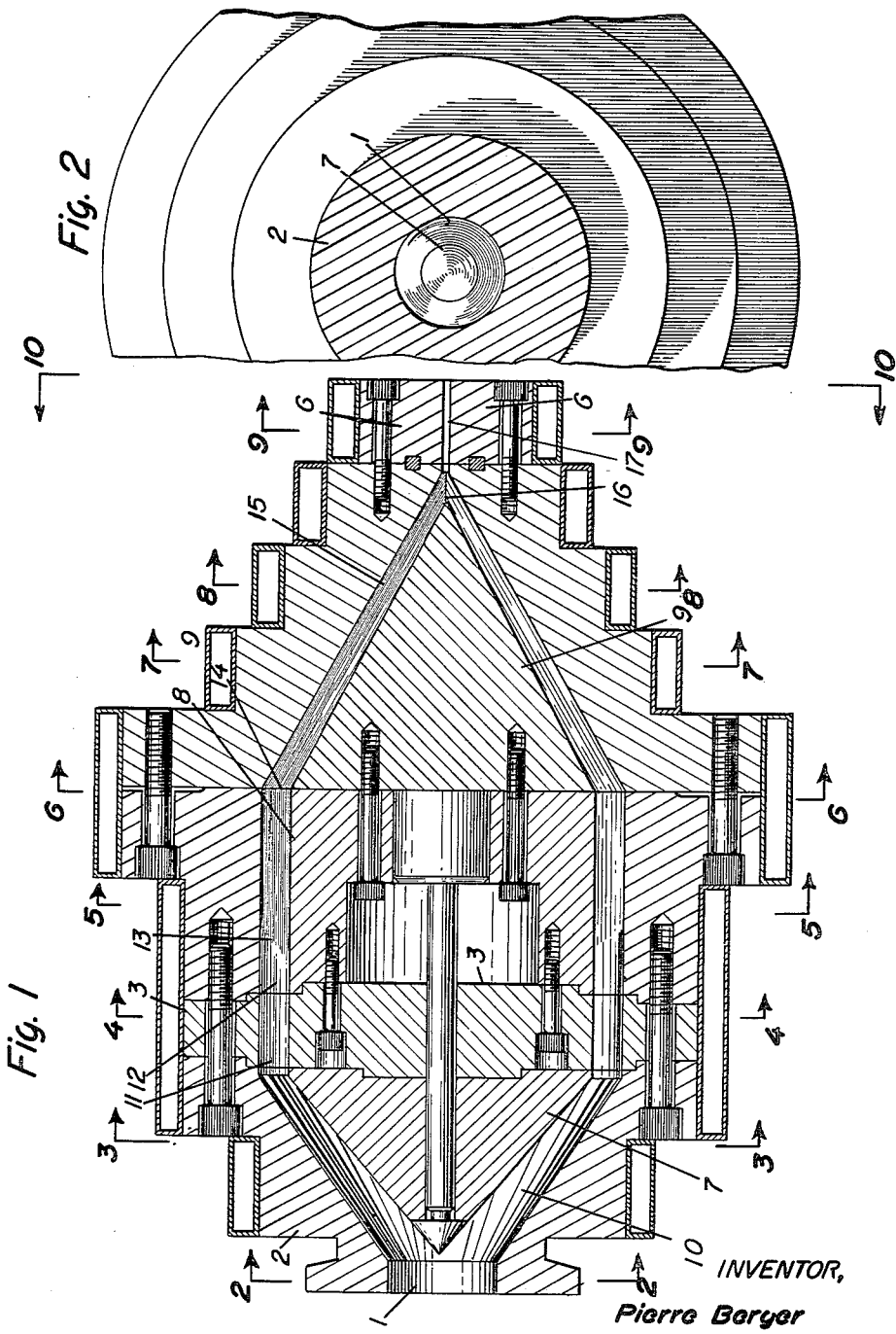

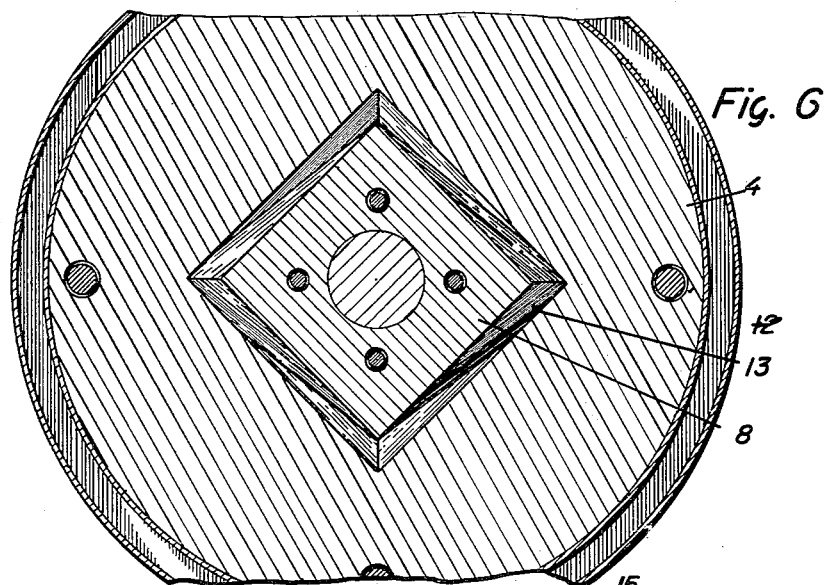
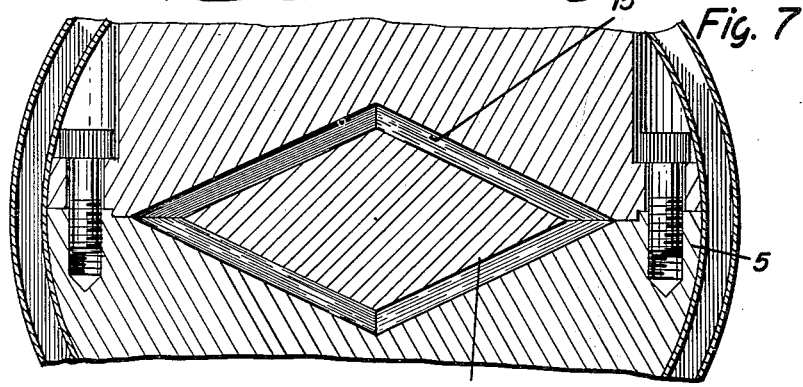
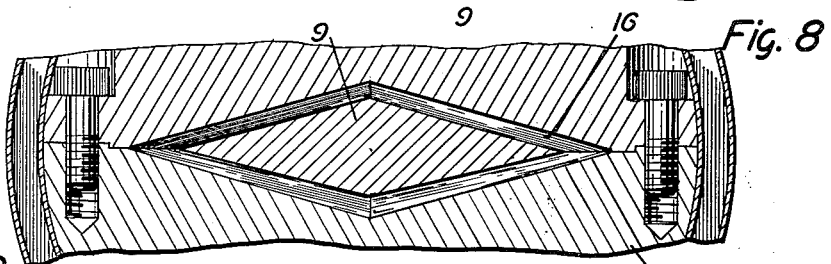
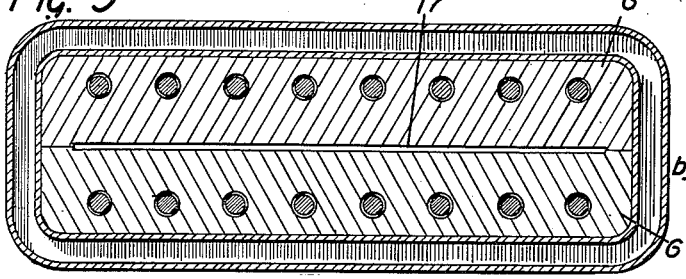

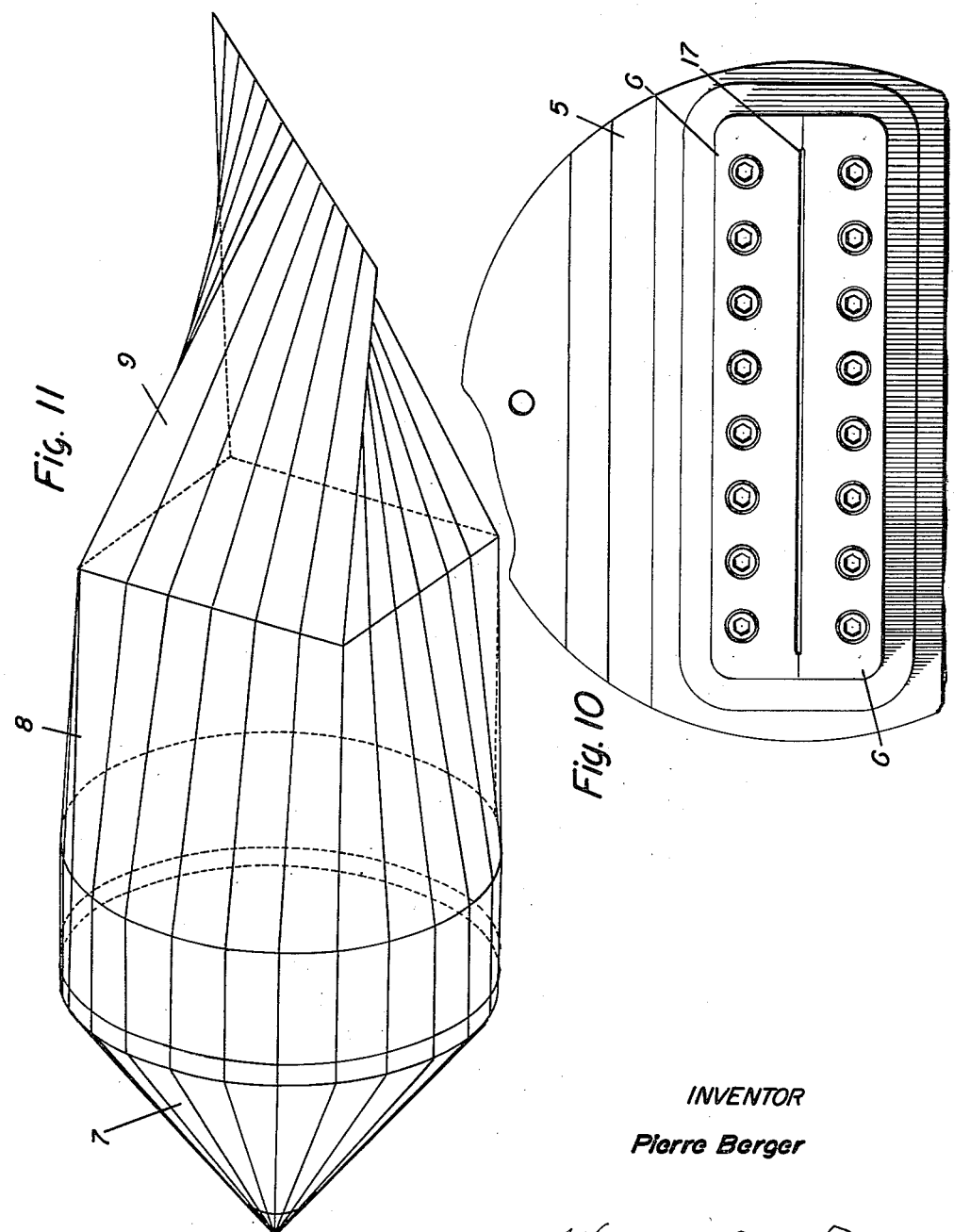

United States Patent Office 3,079,634
Patented Mar. 5, 1963

3,079,634
EXTRUSION APPARATUS
Pierre Berger, Firminy, France, assignor to Compagnie des Ateliers et Forges de la Loire (St. Chamond-Firminy-St. Etienne-Jacob-Holtzer), Paris, France, a society of France
Filed Oct. 14, 1960, Ser. No. 62,640
Claims priority, application France Oct. 16, 1959
2 Claims. (Cl. 18—12)

This invention relates to the extrusion of plastic materials into the form of strip, sheet, and profiled extruded articles of other shapes.

In the extrusion of plastic materials, especially thin-gauge sheet and strip of substantial width, difficulties have been encountered in that the extruded strip or other article is apt to show substantial variations in thickness transversely to the direction of extrusion, as well as a wavy contour. These defects are known to be due primarily to non uniformity in the flow rate of the material adjacent the walls of the extrusion die or nozzle. The non-uniform flow in turn is a consequence of varying flow resistances set up by unequal friction between the material and the die surfaces, and between adjacent layers of the material itself.

It has been attempted to overcome the above defects by providing separately and differentially heated areas around the extrusion die and imparting special configurations to the walls in order to control the fluidity at different points. At best this has been a poor solution because of the complication and high cost entailed and the difficult, tedious and frequently recurring adjustments required. Moreover, while such prior systems have sometimes resulted in an improvement in the production where the extruded material used was of relatively high fluidity over a broad range of temperatures, there are many plastic materials which do not possess these characteristics and in connection with these prior systems just referred to are more or less inoperant.

Objects of this invention are to provide apparatus for extruding plastic materials, which will be substantially free of the above defects, to produce extruded articles, such as sheet, strip and profiled elements of greatly improve cross sectional uniformity including articles of very thin gage, and to achieve such advantageous results by means that are simple and low-cost and not requiring any adjustment during an extrusion process. Another object is to provide an extrusion nozzle or die assembly of improved configuration to ensure substantially uniform friction and uniform flow of the material at all points throughout any cross section of the assembly.

The invention is based on the consideration that the differences in flow rate and friction in a given cross section of a conventional extrusion assembly, which differences are responsible for the afore-mentioned defects, are primarily due to the fact that in the gradual change of configuration from the initial round rod-like length of plastic material at the input of the extrusion nozzle to the final thin-gage flat strip or other product at the output from the nozzle, the material is subjected to considerable changes in thickness in a given cross sectional plane and variations in the lengths of the flowpaths which the different fluid filaments are required to travel from the inlet to the outlet. The invention succeeds in minimizing such variations by causing the material to follow a flowpath of specific geometric configuration to be described hereinafter.

An exemplary embodiment of an extrusion die or nozzle assembly constructed in accordance with the invention will now be described for purposes of illustration but not of limitation with reference to the accompanying drawings wherein:

FIGURE 1 is a simplified view of the assembly in axial cross-section.

FIGURE 2 is a partial sectional view taken upon section line 2—2 of FIGURE 1.

FIGURE 6 is a partial cross-sectional view taken upon section line 6—6 of FIGURE 1.

FIGURE 7 is a similar view taken upon section line 7—7 of FIGURE 1.

FIGURE 8 is a similar view taken upon section line 8—8 of FIGURE 1.

FIGURE 9 is a cross-sectional view taken upon section line 9—9 of FIGURE 1.

FIGURE 10 is a partial side view looking in the direction of the arrows upon section line 10—10 of FIGURE 1, and FIGURE 11 is an isometric projection of the core member used.

Figure 3:
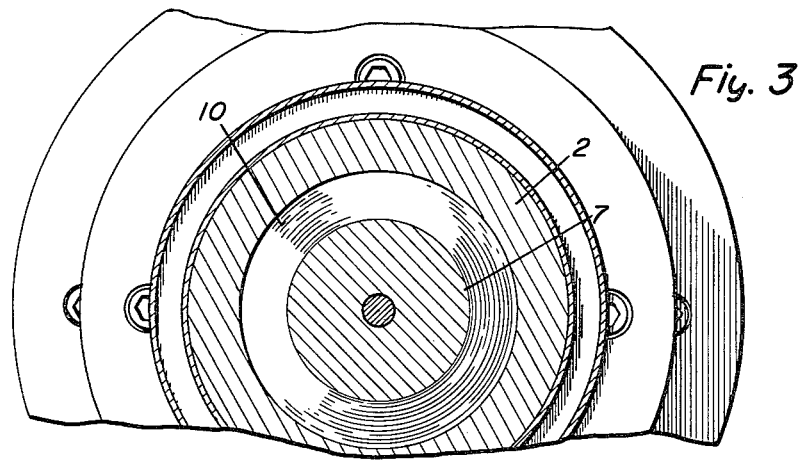
FIGURE 3 is a similar view taken upon section line 3—3 of FIGURE 1.

In the form of embodiment illustrated, the extrusion nozzle assembly is so constructed as to cause the initial cylindrical roll or rod of plastic material to be gradually and continuously deformed first into a thin-walled, annular, diverging cone, then into a thin-walled, annular cylinder, then into a thin-walled prism of square cross section, and the cross sectional contour of such prism thereafter gradually and continuously flattened to the form of a flat strip.

Referring to the drawings, the nozzle assembly shown in FIG. 1 is adapted to be mounted at the output from any desired apparatus of conventional character delivering a continuous body of palstic material in the form of a round cylindrical rod or roll, which is introduced into the inlet aperture 1 of the nozzle assembly. In the form shown the assembly includes an outer body which is comprised of the five contiguous sections 2, 3, 4, 5 and 6 interconnected into a rigid unit by any suitable means such as the screws shown. The foremost body section 2 is provided with the round inlet opening 1 mentioned above followed by a diverging conical passage. The next adjacent body section 3 is formed with a cylindrical aperture. The third body section 4 is formed with an aperture of generally square section merging at its front end with the cylindrical passage in section 2. The fourth section 5 is formed with a converging passage the precise configuration of which will be described later in detail, and the ultimate or die section 7 comprises a pair of extrusion die plates defining between them a narrow calibrated die slot 17 corresponding to the final dimensions of the desired strip.

The afore-described apertures in the outer body sections are seen to cooperate in defining a cavity with oppositely tapered ends and within this cavity is supported a core structure which comprises a front conical section 7, a cylindrical midsection 8, and a rear tapered section 9. The various sections are interconnected by suitable means such as screws, and the resulting unitary core structure is supported in centered relation within the cavity. For this purpose, in the illustrated construction, the body section 3 is provided in the form of a spider flange including an outer rim coaxial with the body sections 2 and 4, and an inner hub interconnected with the rim through spaced radial spider arms as indicated in dotted lines in FIG. 2. As shown, the hub of member 3 is connected by screws with the adjacent core section 8, which in turn is connected by screws with the conical end section 9 of the core. An axially extending screw or bolt interconnects the foremost core section 7 with the cylindrical section 8. By this means the core sections are united into a rigid integral structure and are simultaneously supported in the desired coaxial relation with the outer body. The dimensioning is such that between the body and core sections there is defined a substantially continuous annular passage which includes first the diverging passage section 10, then the section 13, then the converging passage section 15, which latter connects at its tapering end with the elongated outlet slot 17.

Figure 4:
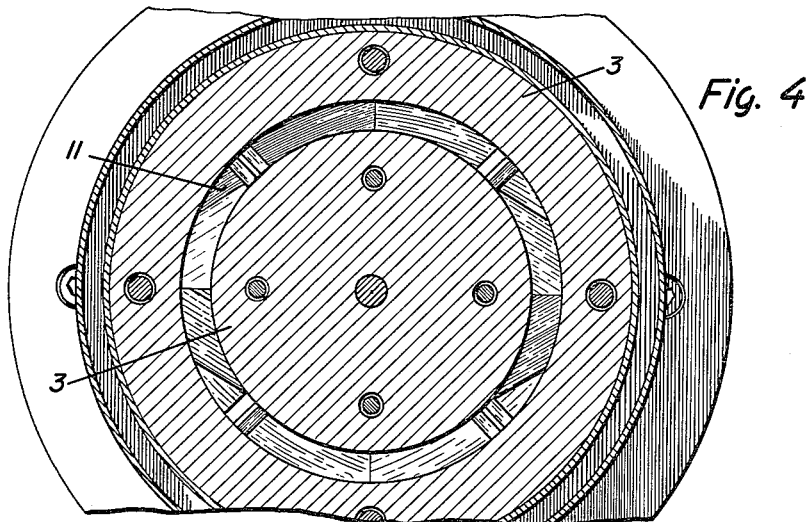
FIGURE 4 is a similar view taken upon section line 4—4 of FIGURE 1.
Figure 5:
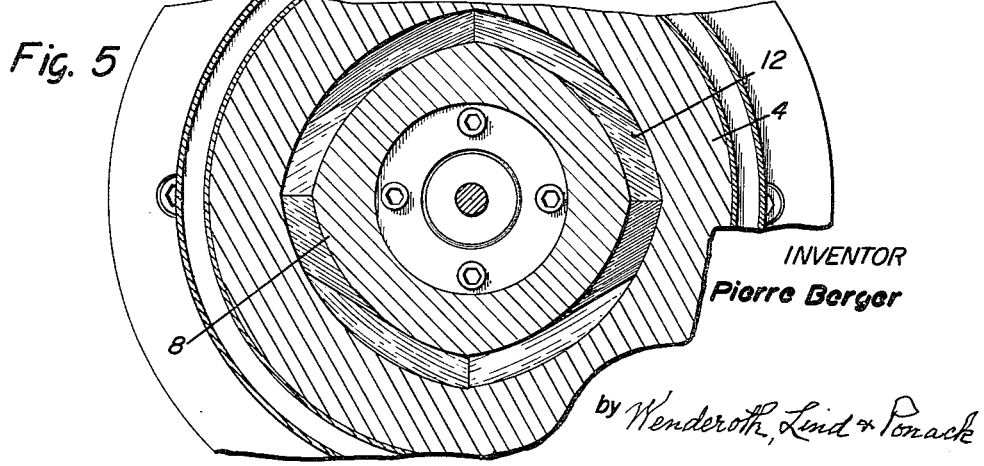
FIGURE 5 is a partial cross-sectional view taken upon section line 5—5 of FIGURE 1.

The complementary shaping of the end body section 5 and end core section 9 is such that the tapering passage 15 defined therebetween has a square cross sectional contour at its larger end as shown in FIG. 3 where it merges with the square prismatic passage 13 in section 14. Thereafter the passage 15 defined between members 5 and 9 is gradually and continuously distorted so that it assumes the shape of a rhomb (see FIG. 4) which gradually grows flatter and flatter and more and more elongated and finally merges into the flat slot 17.

Both in the complementary end sections 5 and 9 just described and the complementary intermediate sections 4 and 8, the surfaces are so formed that the distortion in cross sectional contour along the longitudinal direction of the assembly is effected very gradually and continuously, and for this purpose the cooperating surfaces of the outer end inner sections are formed as ruled skew surfaces.

In operation, the round rod of plastic material is delivered continuously into the inlet 1, and is divided by the conical surface of core section 7 into a diverging annular conical sheet of relatively thin wall thickness. This conical sheet flows from passage 10 into the cylindrical annular passage 11 in the spider plate 3 around the spider arms thereof and thence into annular passage 12 where the portions of flowing material that have been separated by the spider arms again fuse into a continuous annular sheet. In passage 13, the annular cylindrical sheet of material is gradually deformed to assume the form of a thin-walled square prism as it reaches the end plane 14 at which passage 13 connects with the converging passage 15. As it flows through passage 15 the square prismatic shape of the material is gradually distorted into a flatter and flatter rhomb as above described and at the extreme tip 16 of this converging passage the two opposite pairs of walls of the rhomboid sheet merge and fuse into a single flat strip which issues out of the calibrated die outlet 17. It is noted that the gradual rhomboidal distortion in passage 15 is such that the cross sectional contour of the material remains at all times symmetrical on either side of the plane containing the final strip material. As previously indicated, the gradually deformed surfaces are shaped as ruled skew surfaces so that the material at no point encounters sudden variations in flow resistance, but flows smoothly forward substantially in the direction of the thrust applied to it.

The geometry of the flow path imparted to the material through the improved nozzle assembly of the invention is such that differences in lengths of travel as between adjacent filaments or veins of flowing material are reduced to a minimum, and hence velocity gradients in any given cross section of the material are substantially eliminated. This is believed to be a principal reason for the very substantial improvement obtained in the final extruded product as compared to similar products extruded through nozzle or die assemblies of the prior art, especially in regard to uniformity in thickness and freedom from other defects.

It will be understood that various departures may be made from the details of the single exemplary construction illustrated and described without exceeding the scope of the ensuing claims. Thus the precise configurations of the respective sections of the flowpath may be modified while retaining the basic teachings of the invention. Also the invention is applicable ot the extrusion of products other than strips and sheets, for example to profiled articles of relatively thin gauge in connection with which comparable difficulties have been encountered in the past. In such cases of course the shape of the final portion or portions of the flow passage and the die outlet would be modified correspondingly.

What I claim is:

1. Extruding nozzle assembly comprising an outer body having an interior recess and an inlet and an outlet for plastic material formed at opposite ends thereof, a core structure, means for supporting said core structure in centered relation within said recess spaced from said outer body to define between said body and core an annular passage having opposite ends leading to said inlet and outlet, said annular passage including in continuously intermerging sequence a conically diverging initial section, a cylindrical section, a prismatic section, and a converging end section having cross sections shaped as progressively flattened rhombs towards said outlet.

2. The nozzle assembly claimed in claim 1, wherein the surfaces of said body recess and core are formed as ruled skew surfaces within the area defining the merging between said cylindrical and prismatic sections, and within the area defining said end section.

References Cited in the file of this patent

UNITED STATES PATENTS

| | | |
|---|---|---|
| 1,182,199 | Norris | May 9, 1916 |
| 1,679,545 | Roth | Aug. 7, 1928 |
| 2,210,004 | Rautenstrauch | Aug. 6, 1940 |
| 2,233,987 | Orsini | Mar. 4, 1941 |
| 2,810,159 | Teichmann | Aug. 22, 1957 |

FOREIGN PATENTS

| | | |
|---|---|---|
| 346,718 | Great Britain | Apr. 15, 1931 |
| 658,102 | Germany | Mar. 10, 1938 |
| 495,144 | Great Britain | Nov. 8, 1938 |